G. H. SAWYER.

CORN KNIFE AND SHIELD.

No. 10,693. Reissued Feb. 23, 1886.

*Witnesses*

*Fred. G. Fischer*

*H. B. Wyman*

*Inventor*

*George H. Sawyer*

*By his Attorneys*

*Munn & Ward*

N. PETERS, Photo-Lithographer, Washington, D. C.

UNITED STATES PATENT OFFICE.

GEORGE HENRY SAWYER, OF LAMOILLE, ILLINOIS.

CORN KNIFE AND SHIELD.

SPECIFICATION forming part of Reissued Letters Patent No. 10,693, dated February 23, 1886.

Original No. 328,344, dated October 13, 1885. Application for reissue filed January 4, 1886. Serial No. 187,623.

*To all whom it may concern:*

Be it known that I, GEORGE HENRY SAWYER, a citizen of the United States, residing at Lamoille, in the county of Bureau and State of Illinois, have invented certain new and useful Improvements in Corn-Cultivator Knives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in corn-cultivators, and more especially pertains to the construction and use of a thin narrow cutting knife or blade placed and drawn on edge near the hills of corn, and having its extreme rear end curved laterally from the corn, so as to force outward a certain width of the surface of the ground contiguous to the outer face of such knife, and the weeds or vines growing in such removed strip.

Figure 1:
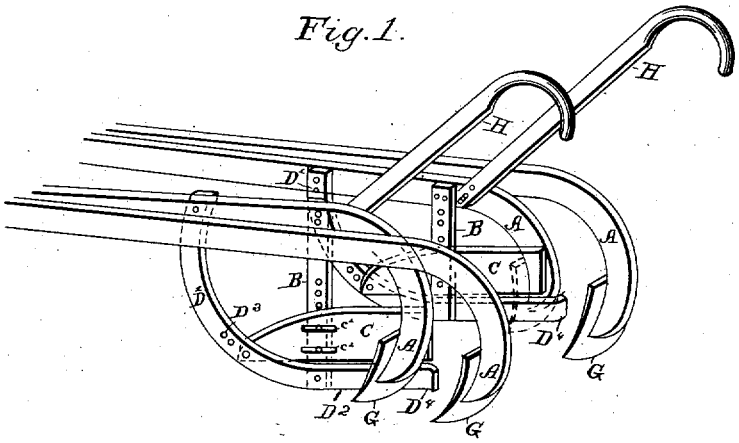
Figure 2:
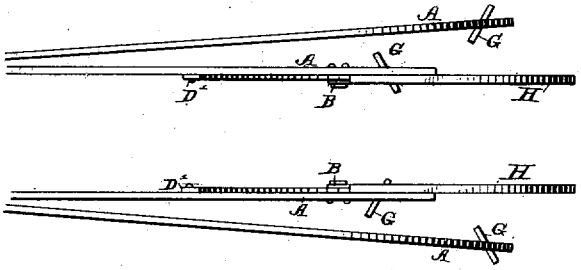
Figure 3:
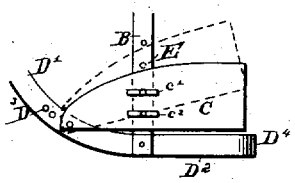

In the drawings, Figure 1 is a perspective view of the rear portion of a cultivator furnished with my invention. Fig. 2 is a partial plan thereof. Fig. 3 is a detailed view of the knife and shield.

My invention is applicable to either one or two horse cultivators. In the drawings it is exhibited as attached to a two-horse cultivator having shovels G G, and in which a pair of shovels pass on each side of the row of corn-hills. The track of each rear shovel is outside of that of the adjacent front one, and the knife D is placed inside of each front or inner shovel, and between the latter and the row of corn-hills, and for the best results the knife should be about two inches from the inner edge of the inner shovel. The knife D is bent upward at its front end, D′, and suitably bolted to the beam A of the cultivator. The straight lower edge, $D^2$, of the knife D extends from some distance in front of the shovel G to the extreme rear end of such knife, and about six inches of the rear end of the knife D is curved (on a radius of about four and a half inches) outwardly from the corn-row. In this curve $D^3$ the vertical or edgewise position of the knife D is maintained, as otherwise accumulations and the earth in front of such curve would pass over or under the latter, instead of out at its end.

The knife D is preferably made of steel, and has its front and entire lower surface drawn to a cutting-edge. This knife is not over one and one-half inch in width, and in operation enters the ground about from one-half to two-thirds of its width. It is hung so that its movement, which is longitudinal, shall be in the line of movement of the machine, and its front end can be bent laterally, or in any direction to reach a convenient point of attachment to the cultivator.

The function of the knife D is to cut a vertical gash through the weeds or vines, which gash the curve $D^3$ widens by forcing its outer wall outward, or from the corn. By reason of such knife having no action on its side next the corn it can be run very close to the latter—with ordinary care to within less than one inch.

The extreme narrowness of the knife D results in the latter offering no obstruction to the passage of earth from the shovels G over such knife and around and among the stalks of corn, when the latter are strong enough to stand up against such loose earth, and the shield C can be advantageously used with such knife by suspending such shield a small distance above such knife, so that the finer earth from the shovels G can pour through the interval between the knife and shield to and around the corn as the latter becomes strong enough to resist the pressure. As the corn gets larger the width of this interval may be increased, and when the corn is sufficiently large the knife may be used without the shield. The knife D is secured against lateral oscillation by means of the vertical standard B, the lower end of which is bolted to the outer face of the knife D, about midway of the horizontal part of the latter, and at its upper end to the beam A, or any other suitable point on the cultivator. The front end of the shield C is bolted in one of the holes $D^3$ to the bowed portion of the knife D, and the body of such shield is attached to the inner face of the standard B by bolts passed through horizontal slots C′ and $C^2$ in such shield, and through holes E in the standard B.

A series of holes in the knife D and standard B at the points of attachment of the shield C render it feasible to adjust the latter as desired in relation to the knife D.

The shield C may be attached to the knife or to the cultivator in any other suitable mode with the same result.

The advantage of my invention is that the cutting-knife D has no action between its vertical cutting-edge and the corn. It can therefore be used to remove weeds or vines growing in close proximity to the corn, when such vines or weeds are too large to be covered where they stand, and when it is not desirable to use a shield, such knife creating no obstruction to the flow of dirt from the shovels, and by reason of said knife having no action on the corn side of the cutting-edge it can be guided close to the corn when the latter is very small, and can be used with a shield and the flow of dirt between such knife and shield graduated to the size of the corn, as aforesaid. Again, when the shield is removed or raised sufficiently to permit a reasonable flow of dirt over the knife, the earth being moved outwardly by the latter and inwardly by the shovels, the ground is left nearer level than with the usual corn-working implements.

What I claim as my invention, and desire to secure by Letters Patent of the United States, is—

1. In combination with a corn-cultivator having shovels G, a long narrow knife or blade, D, set vertically on its cutting-edge throughout its entire operating surface, and provided with the rear lateral curve, $D^4$, and suitably attached next the corn to such cultivator, so as to be drawn lengthwise parallel with the line of movement of the machine, substantially as shown, and for the purpose described.

2. In combination with a corn-cultivator having shovels G, the long narrow knife D, set vertically on its edge throughout its entire contact with the ground, and provided with the lateral curve $D^4$, substantially as shown, and for the purpose described.

3. In combination with a corn-cultivator having shovels G, the long narrow knife D, set vertically on its cutting-edge throughout its entire contact with the ground, and provided with the lateral curve $D^4$, and the shield C, adjustable vertically in relation to said knife, substantially as shown, and for the purpose described.

4. The combination of the knife, the shield pivoted thereto, and the standard provided with a series of bolt-holes, whereby the shield may be adjusted to any desired angle, as and for the purposes specified.

In witness whereof I have hereunto set my hand, at Sterling, aforesaid, this 24th day of December, 1885, in the presence of two witnesses.

GEORGE HENRY SAWYER.

Witnesses:
GEO. W. CHAMBERLIN,
J. P. SCOTT.